United States Patent
Sun et al.

(10) Patent No.: US 9,558,744 B2
(45) Date of Patent: Jan. 31, 2017

(54) AUDIO PROCESSING APPARATUS AND AUDIO PROCESSING METHOD

(71) Applicant: DOLBY LABORATORIES LICENSING CORPORATION, San Francisco, CA (US)

(72) Inventors: Xuejing Sun, Beijing (CN); Shen Huang, Beijing (CN); Poppy Crum, Oakland, CA (US); Hannes Muesch, Oakland, CA (US); Glenn N. Dickins, Como (AU); Michael Eckert, Ashfield (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/650,214

(22) PCT Filed: Nov. 27, 2013

(86) PCT No.: PCT/US2013/072282
§ 371 (c)(1),
(2) Date: Jun. 5, 2015

(87) PCT Pub. No.: WO2014/099319
PCT Pub. Date: Jun. 26, 2014

(65) Prior Publication Data
US 2015/0348546 A1 Dec. 3, 2015

Related U.S. Application Data
(60) Provisional application No. 61/759,952, filed on Feb. 1, 2013.

(30) Foreign Application Priority Data
Dec. 20, 2012 (CN) .......................... 2012 1 0559745

(51) Int. Cl.
*G06F 17/00* (2006.01)
*G06F 17/27* (2006.01)
(Continued)

(52) U.S. Cl.
CPC .............. *G10L 15/20* (2013.01); *G10L 21/02* (2013.01); *H04M 3/568* (2013.01)

(58) Field of Classification Search
CPC .......... G06F 17/00; G06F 17/27; G10L 19/05; G10L 21/00
(Continued)

(56) References Cited

U.S. PATENT DOCUMENTS 6,115,537 A 9/2000 Yamada
6,785,261 B1 8/2004 Schuster
(Continued)

FOREIGN PATENT DOCUMENTS

DE 3638922 5/1988
EP 2 289 065 3/2011
WO 2009/155803 4/2009

OTHER PUBLICATIONS

Shriberg et al., "A prosody only decision-tree model for disfluency detection." Eurospeech. vol. 97. 1997.*
(Continued)

*Primary Examiner* — Pierre-Louis Desir
*Assistant Examiner* — Seong Ah A Shin

(57) ABSTRACT

An audio processing apparatus and an audio processing method are described. In one embodiment, the audio processing apparatus include an audio masker separator for separating from a first audio signal an audio material comprising a sound other than stationary noise and utterance meaningful in semantics, as an audio masker candidate. The apparatus also includes a first context analyzer for obtaining statistics regarding contextual information of detected audio
(Continued)

masker candidates, and a masker library builder for building a masker library or updating an existing masker library by adding, based on the statistics, at least one audio masker candidate as an audio masker into the masker library, wherein audio maskers in the maker library are used to be inserted into a target position in a second audio signal to conceal defects in the second audio signal.

23 Claims, 11 Drawing Sheets

(51) Int. Cl.
*G10L 19/00* (2013.01)
*G10L 21/00* (2013.01)
*G10L 15/20* (2006.01)
*G10L 21/02* (2013.01)
*H04M 3/56* (2006.01)

(58) Field of Classification Search
USPC .................. 704/9, 205, 243, 233; 700/94
See application file for complete search history.

(56) References Cited

U.S. PATENT DOCUMENTS

| | | | |
|---|---|---|---|
| 6,912,584 | B2 | 6/2005 | Wang |
| 6,993,483 | B1 | 1/2006 | Milner |
| 7,181,021 | B2 | 2/2007 | Raptopoulos |
| 7,376,127 | B2 | 5/2008 | Hepworth |
| 8,000,960 | B2 | 8/2011 | Chen |
| 2002/0133764 | A1 | 9/2002 | Wang |
| 2003/0137537 | A1* | 7/2003 | Guo ................. G10L 15/22 715/751 |
| 2003/0144055 | A1* | 7/2003 | Guo ................. G06T 13/40 463/35 |
| 2005/0049853 | A1 | 3/2005 | Lee |
| 2009/0190780 | A1* | 7/2009 | Nagaraja ........... G10L 19/012 381/119 |
| 2009/0240490 | A1 | 9/2009 | Kim |
| 2010/0088092 | A1 | 4/2010 | Bruhn |
| 2010/0094642 | A1 | 4/2010 | Zhang |
| 2010/0174533 | A1* | 7/2010 | Pakhomov ............ G10L 15/005 704/205 |
| 2010/0312553 | A1 | 12/2010 | Fang |
| 2011/0040554 | A1* | 2/2011 | Audhkhasi ............ G09B 19/04 704/9 |
| 2011/0082575 | A1* | 4/2011 | Muesch ............... G10L 19/005 700/94 |
| 2014/0176603 | A1* | 6/2014 | Kumar .................. G06F 3/011 345/633 |
| 2014/0310595 | A1* | 10/2014 | Acharya ............... G06F 9/4446 715/706 |
| 2015/0032446 | A1 | 1/2015 | Dickins |
| 2015/0058013 | A1* | 2/2015 | Pakhomov ............. G10L 25/78 704/243 |
| 2015/0081283 | A1 | 3/2015 | Sun |

OTHER PUBLICATIONS

Perkins, C. et al "A Survey of Packet Loss Recovery Techniques for Streaming Audio" IEEE Communications Society, vol. 12, Issue 5, Sep.-Oct. 1998.

Sun, X. et al "Robust Noise Estimation Using Minimum Correction with Harmonicity Control" Interspeech 2010, 11th Annual Conference of the International Speech Communication Association, Sep. 26-30, 2010.

Borgstrom, Bengt Jonas "Inference of Missing or Degraded Data for Noise Robust Speech Processing" ProQuest Dissertations and Theses, 2010.

Shriberg, E. et al "A Prosody-Only Decision-Tree Model for Disfluency Detection" 5th European Conference on Speech Communication and Technology, Eurospeech, Sep. 22-25, 1997, pp. 2383-2386.

Freund, Y. et al "A Decision-Theoretic Generalization of On-Line Learning and an Application to Boosting" vol. 55, Issue 1, Aug. 1997, pp. 119-139.

Freund, Y. et al "A Short Introduction to Boosting" Journal of Japanese Society for Artificial Intelligence, 771-780, Sep. 1999.

Huang, X. et al "Spoken Language Processing: A Guide to Theory, Algorithm, and System Development" 2001.

Moder, C. et al "Discourse Across Languages and Cultures (Studies in Language Companion Series" Aug. 31, 2004, John Benjamins Publishing Company.

Schiffrin, Deborah "Discourse Markers" Studies in interactional sociolinguistics, Cambridge, Feb. 26, 1988.

* cited by examiner

# AUDIO PROCESSING APPARATUS AND AUDIO PROCESSING METHOD

CROSS-REFERENCE TO RELATED APPLICATIONS

This application claims priority to Chinese Patent Application No. 201210559745.2 filed 20 Dec. 2012 and U.S. Provisional Patent Application No. 61/759,952 filed 1 Feb. 2013, each of which is hereby incorporated by reference in its entirety.

TECHNICAL FIELD

The present application relates generally to audio signal processing. More specifically, embodiments of the present application relate to audio processing apparatus and audio processing methods for improving perceived quality of an audio signal transmitted over a remote path.

BACKGROUND

Voice communication may be subject to different quality problems. For example, if the voice communication is conducted on a packet-switch network, due to delay jitters occurring in the network or due to bad channel conditions, such as fading or interference with WIFI, some packets may be lost, which makes the voice perceived by the listener not continuous. Due to the packet losses, or due to the measures adopted to conceal the packet losses such as packets interpolation or extrapolation, artifacts may occur in the voice heard by the listener and make the heard voice sounds unnatural.

Even if there are no artifacts or packet losses, sometimes the talker's silence may be misunderstood by the listener as the network's failure and thus the listener's experience of the voice communication system is not so good, especially when the transmitting side pre-processing suppresses the background noise so completely (or when the system just transmits empty packets without any information) that the listener just hear complete silence.

SUMMARY

According to an embodiment of the application, an audio processing apparatus is provided, which includes: an audio masker separator for separating from a first audio signal an audio material comprising a sound other than stationary noise and utterance meaningful in semantics, as an audio masker candidate; a first context analyzer for obtaining statistics regarding contextual information of detected audio masker candidates; and a masker library builder for building a masker library or updating an existing masker library by adding, based on the statistics, at least one audio masker candidate as an audio masker into the masker library, wherein audio maskers in the maker library are used to be inserted into a target position in a second audio signal to conceal defects in the second audio signal.

According to another embodiment, an audio processing apparatus includes a masker library comprising audio maskers to be inserted into a target audio signal to conceal defects in the target audio signal, a masker selector for selecting an audio masker from the masker library; and a masker inserter for inserting the selected audio masker into a target position in the target audio signal.

Another embodiment of the present application provides an audio processing method, which include: separating from a first audio signal an audio material comprising a sound other than stationary noise and utterance meaningful in semantics, as an audio masker candidate; obtaining statistics regarding contextual information of detected audio masker candidates; and building a masker library or updating an existing masker library by adding, based on the statistics, at least one audio masker candidate as an audio masker into the masker library, wherein audio maskers in the maker library are used to be inserted into a target position in a second audio signal to conceal defects in the second audio signal.

According to yet another embodiment, an audio processing method include selecting an audio masker from a masker library comprising audio maskers to be inserted into a target audio signal to conceal defects in the target audio signal; and inserting the selected audio masker into a target position in the target audio signal.

BRIEF DESCRIPTION OF DRAWINGS

The present application is illustrated by way of example, and not by way of limitation, in the figures of the accompanying drawings and in which like reference numerals refer to similar elements and in which.

DETAILED DESCRIPTION

Figure 1A:
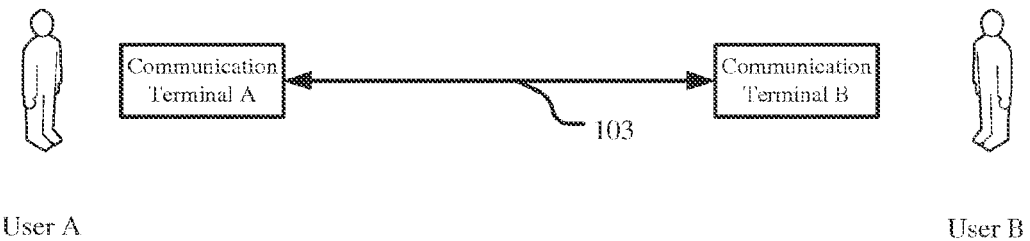
FIG. 1A is a diagram schematically illustrating an exemplary voice communication system where embodiments of the application can be applied.

The embodiments of the present application are below described by referring to the drawings. It is to be noted that, for purpose of clarity, representations and descriptions about those components and processes known by those skilled in the art but not necessary to understand the present application are omitted in the drawings and the description.

As will be appreciated by one skilled in the art, aspects of the present application may be embodied as a system, a device (e.g., a cellular telephone, a portable media player, a personal computer, a server, a television set-top box, or a digital video recorder, or any other media player), a method or a computer program product. Accordingly, aspects of the present application may take the form of an hardware embodiment, an software embodiment (including firmware, resident software, microcodes, etc.) or an embodiment combining both software and hardware aspects that may all generally be referred to herein as a "circuit," "module" or "system." Furthermore, aspects of the present application may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic or optical signal, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present application may be written in any combination of one or more programming languages, including an object oriented programming language such as Java, Smalltalk, C++ or the like and conventional procedural programming languages, such as the "C" programming language or similar programming languages. The program code may execute entirely on the user's computer as a stand-alone software package, or partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present application are described below with reference to flowchart illustrations and/or block diagrams of methods, apparatus (systems) and computer program products according to embodiments of the application. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

System Overview

FIG. 1A is a diagram schematically illustrating an example voice communication system where embodiments of the application can be applied.

As illustrated in FIG. 1A, user A operates a communication terminal A, and user B operates a communication terminal B. In a voice communication session, user A and user B talk to each other through their communication terminals A and B. The communication terminals A and B are coupled through a data link 103. The data link 103 may be implemented as a point-to-point connection or a communication network. At either side of user A and user B, VAD (Voice Activity Detection) is performed on audio blocks of the audio signal captured by the user's communication terminal. If voice presence is decided in an audio block, corresponding processing (e.g., applying a gain suitable for voice) is performed on the audio block and the audio block is transmitted to another user's communication terminal A through the data link 103. If no voice presence is decided in an audio block, corresponding processing (e.g., applying a gain suitable for non-voice) is performed on the audio block and the audio block is transmitted to another user's communication terminal A through the data link 103. In this case, it is also possible to transmit simple information indicating a silence period to the other user's communication terminal, or to indicate that the time period corresponding to this audio block is silent by transmitting nothing. The other user's communication terminal receives the transmitted audio blocks and stores them in its jitter buffer, to eliminate transmission jitters. Audio blocks in the jitter buffer are fed through decoding and processing to reproduce them at the output transducer or transducers of the communication terminal.

Figure 1B:
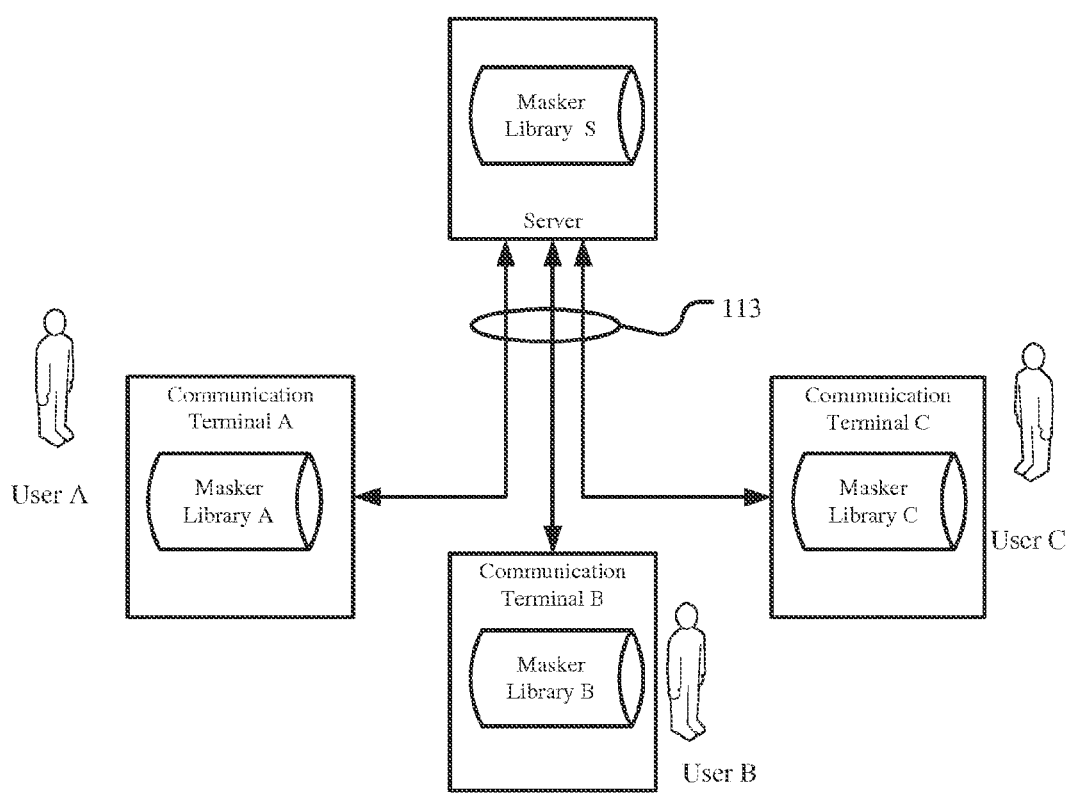
FIG. 1B is a diagram schematically illustrating another exemplary voice communication system where embodiments of the application can be applied.

FIG. 1B is a diagram schematically illustrating another example voice communication system where embodiments of the application can be applied. In this example, a voice conference may be conducted among users.

As illustrated in FIG. 1B, user A operates a communication terminal A, user B operates a communication terminal B, and user C operates a communication terminal C. In a voice conference session, user A, user B and user C talk to each other through their communication terminals A, B and C. The communication terminals illustrated in FIG. 1B have the same function as those illustrated in FIG. 1A. However, the communication terminals A, B, and C are coupled to a server through a common data link 113 or separate data links 113. The data link 113 may be implemented as a point-to-point connection or a communication network. At either side of user A, user B, and user C, VAD is performed on audio blocks of the audio signal captured by the user's communication terminal. If voice presence is decided in an audio block, corresponding processing (e.g., applying a gain suitable for voice) is performed on the audio block and the audio block is transmitted to the server through the data link 113. If no voice presence is decided in an audio block, corresponding processing (e.g., applying a gain suitable for non-voice) is performed on the audio block and the audio block is transmitted to the server through the data link 113. In this case, it is also possible to transmit simple information indicating a silence period to the server 115, or to indicate that the time period corresponding to this audio block is silent by transmitting nothing. The server receives the transmitted audio blocks and stores them to entries corresponding to the same time as the audio blocks in its jitter buffers associated with the users respectively, to eliminate transmission jitters. Audio blocks corresponding to the same time in the jitter buffers are mixed into one audio block and the mixed audio block is transmitted to all users A, B, and C. The users' communication terminals receive the audio blocks from the server and store them in their jitter buffers, to eliminate transmission jitters. In each communication terminal, audio blocks in the jitter buffer are fed to a voice processor to reproduce them through the speaker system of the communication terminal. Although three communication terminals are illustrated in FIG. 1B, there can reasonably be two or more communication terminals coupled in the system.

As discussed in the background part, packet losses, artifacts or the talker's silence may occur and make the listener's experience not so good. In the present application it is proposed to use proper audio materials, which may be referred to as audio maskers, to conceal the defects in the audio signal to be heard by the listener, by filling the talker's silence and/or the packet losses or replacing the artifacts with the audio maskers. Then as shown in FIG. 1B, the communication terminals A, B, and C and/or the server may be provided with masker libraries A, B, C, and S (which can be duplicates of the same masker library, or can be different masker libraries), and a proper audio masker may be extracted therefrom to conceal a defect in the audio signal. The system shown in FIG. 1A is similar, although without showing masker libraries.

The masker libraries may be set up off-line and equipped to the communication terminals and/or the server. They may also be set up on-line on the talker side (sender side) and/or server side, and then transmitted to the server side, and/or listener side (receiver side). Alternatively, the off-line masker libraries may be updated on-line or off-line to be adapted to new talkers and new environments.

Therefore, the present application provides both apparatus for building the masker libraries (pre-processing) and apparatus for applying the masker libraries to audio signals, as well as system/apparatus incorporating both.

Pre-Processing: Masker Library Building

Figure 2:
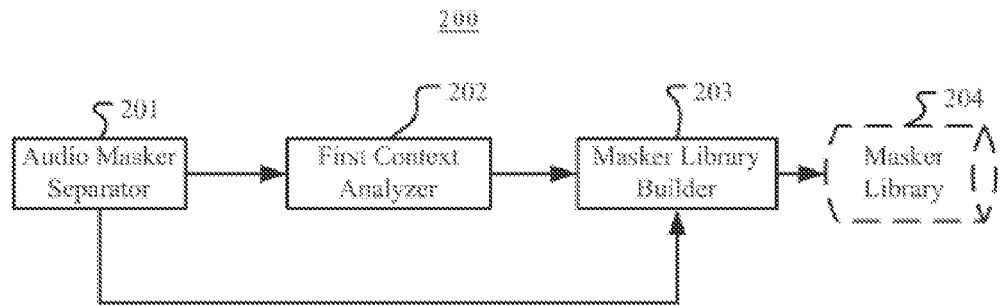
FIG. 2 is a diagram illustrating an audio processing apparatus according to an embodiment of the application.

FIG. 2 is a diagram illustrating an audio processing apparatus 200 according to a first embodiment of the application, for building or updating on-line or off-line a masker library to be used in defects concealing apparatus/process to be discussed further later.

As shown in FIG. 2, the audio processing apparatus 200 includes an audio masker separator 201 for separating from a first audio signal an audio material comprising a sound other than stationary noise and utterance meaningful in semantics, as an audio masker candidate; a first context analyzer 202 for obtaining statistics regarding contextual information of detected audio masker candidates; and a masker library builder 203 for building a masker library 204 or updating an existing masker library 204 by adding, based on the statistics, at least one audio masker candidate as an audio masker into the masker library 204, wherein audio maskers in the maker library are used to be inserted into a target position in a second audio signal to conceal defects in the second audio signal.

The first audio signal serves as a source of the audio masker candidates (and future audio maskers). In other words, audio maskers are audio materials extracted from the first audio signal and can be used to conceal defects in the target audio signal (second audio signal). When there are talker's silence, packet losses, or artifacts in the second audio signal, the audio maskers may be inserted into the position (target position) of the silence, packet loss or artifacts to make the resulted audio signal, that is improved audio signal, sounds more natural. For example, during the talker's hesitation, sound of keyboard typing may be inserted, so that the listener will hear something instead of dead silence.

As for the audio masker, it must not interfere with the talker's speech in terms of semantics and thus the audio masker can not be utterance/speech meaningful in semantics. For example, we can not insert a piece of speech of topic X into a silence period between talkspurts focusing on topic Y. On the other hand, the audio masker may not be ordinary noise having no relation (or no obvious relation) to the present talker and his/her environment, and adding such noise are just an inverse process with respect to the noise suppressing process on the sender side and/or receiver side, and thus being meaningless or even wasting computing resources. Even if the noise is specific to the environment where the talker is located, the effect will be the same if the noise is continuous and constant. We refer to such ordinary noise or continuous and constant noise as stationary noise, in contrast to non-stationary noise.

Then, the audio masker may be an audio material comprising non-stationary noise, which occasionally occurs in the environment of the talker, such as the sound of keyboard tying or mouse click, or cough of the talker or his/her colleagues, or footsteps. Then, when using such audio maskers, the listener would anticipate the talker is continuing the talk, which is just masked by the masker such as coughing or typing keyboard, rather than think that the network is interrupted (although it may be true) or that the talker forgets his words.

Figures 3A, 3B:
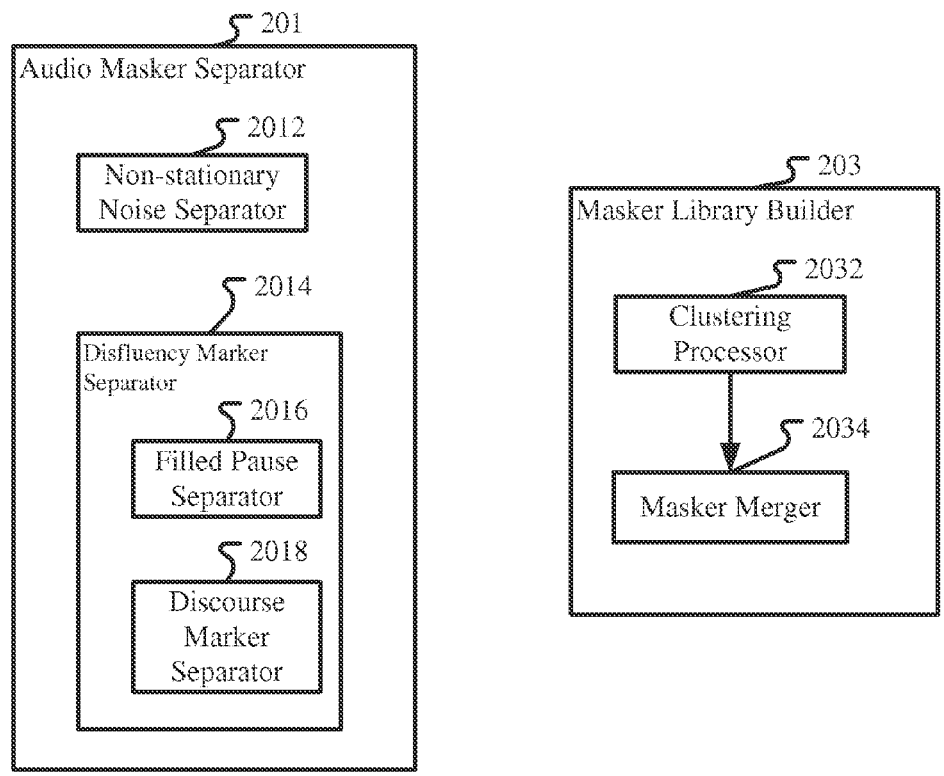
FIG. 3A is a diagram illustrating the audio masker separator 201 in FIG. 2 according to a variation of the embodiment in FIG. 2.
FIG. 3B is a diagram illustrating the masker library builder 203 in FIG. 2 according to another variation of the embodiment in FIG. 2.

Therefore, as shown in FIG. 3A, according to a variation of the embodiment in FIG. 2, the audio masker separator 201 in FIG. 2 may comprise a non-stationary noise separator 2012 for separating an audio material comprising non-stationary noise as the audio masker. Such an audio material may be an audio segment extracted from the audio signal captured at the communication terminal of the talker, which comprises only the non-stationary noise but no utterance of the talker. That is, the audio segment may correspond to a hesitation of the talker or a relatively long time of silence of the talker. However, the audio material may also be obtained by processing a mixed audio signal comprising both the talker's utterance and the non-stationary noise (and stationary noise) and separating the non-stationary noise out from the mixed audio signal.

For non-stationary noise detection and separation, a machine learning based approach may be adopted, such as Ada-Boost algorithm (Freund, Yoav; Schapire, Robert E. (1995). A Decision-Theoretic Generalization of on-Line Learning and an Application to Boosting.) or HMM models (Xuedong Huang, Alex Acero, and Hsiao-Wuen Hon (2001). Spoken Language Processing. Prentice Hall).

The audio maskers may also be some utterances without meaning specific to context and thus without interfering with the speech in the target audio signal. We refer to such utterances as disfluency markers because they indicate semantic pauses between meaningful sentences/phrases of a talker.

Disfluency markers, also called fillers, include unlexicalized types (e.g., uh, um), lexicalized types (e.g., well, like) and hesitation. Only unlexicalized types (e.g., uh, um) and lexicalized types (e.g., well, like) are used as audio maskers, and they are also called as filled pause and discourse markers (see Carol Lynn, Moder; Aida Martinovic-Zic (2004). *Discourse Across Languages and Cultures*. John Benjamins Publishing Company. pp. 117. 9027230781; Or see Schiffrin, Deborah (1986), *Discourse markers*, Studies in interactional sociolinguistics, 5., Cambridge [Cambridgeshire], ISBN 978-0-521-30385-9), respectively. The following table shows the three kinds of disfluency markers. Most disfluency markers, such as filled pauses, are not generally recognized as purposeful or containing formal meaning, but convey an important message to the listeners that the conversation continues and the talker wishes to pause without voluntarily yielding control of the dialogue. This is important in a multi-party call situation where unfilled gaps caused by packet loss may lead to listeners' interruption of the conversation.

| Type | Example |
| --- | --- |
| Hesitation | This is (silence) an example |
| Filled pause | This uh.. is an example |
| | This is an um.. example |
| Discourse marker | Well, this is an example |

Therefore, as shown in FIG. 3A, according to a variation of the embodiment in FIG. 2, the audio masker separator 201 in FIG. 2 may comprise a disfluency marker separator 2014 for separating an audio material comprising a disfluency marker as the audio masker. Further, the disfluency marker separator 2014 may comprise a filled pause separator 2016 for separating an audio material comprising a filled pause and a discourse marker separator 2018 for separating an audio material comprising a discourse marker.

Again, for disfluency marker detection including filled pause detection/separation and discourse marker detection/separation, a machine learning based approach may be adopted, such as Ada-Boost algorithm or HMM models. The following is a simple introduction to some aspects of those disfluency detection techniques, but the present application is not limited thereto.

Extensive research has been conducted in the past on disfluency detection, particularly in the field of automatic speech recognition (ASR). In many languages including English, the filled pauses such as uh and um generally exhibit a low variation pattern in pitch, energy, and spectrum. Therefore we may detect the stationarity of a speech segment in terms of pitch, energy, and spectrum, use the properties relating to pitch, energy, and spectrum of speech segments as the features used in training of models or classifier and classification/identification of disfluency markers.

Energy estimation is straightforward, which can simply be estimates of the total energy for each short time signal frame. Pitch can be estimated either in the time domain using Normalized Cross Correlation (NCC) or in the MDCT domain using the method described in U.S. Patent Application No. 61/619,219, filed Apr. 2, 2012, entitled Harmonicity Estimation, Audio Classification, Pitch Determination and Noise Estimation, Sun, et al. Energy and pitch variation may be derived by computing the difference among adjacent frames.

Spectral variation may be represented by spectral flux:

$$SF = \frac{\sum_{k=1}^{N}(||M_{i,k}|-|M_{i-1,k}||)}{\sum_{k=1}^{N}(|M_{i,k}|+|M_{i-1,k}|)} \quad (1)$$

Where $M_{i,k}$ denotes the MDCT coefficient at frame i and frequency bin k, and N is the total number of MDCT frequency bins.

The so-called pseudo spectrum sometimes may give more robust output, which is calculated as (with the index i omitted):

$$S_k = ((M_k^2 + (M_{k+1} - M_{k-1})^2)^{0.5} \quad (2)$$

And the spectral flux on pseudo spectrum is:

$$SF = \frac{\sum_{k=1}^{N}(||S_{i,k}|-|S_{i-1,k}||)}{\sum_{k=1}^{N}(|S_{i,k}|+|S_{i-1,k}|)} \quad (3)$$

Where i, k and N have the same meaning as in equation (1).

By using the features described above, for example, a machine learning based classifier may be trained with training data. For example, a classifier with reasonably low complexity can be built based on the AdaBoost algorithm. Furthermore, disfluency marker models can be trained using HMM-based techniques, which is a widely used approach in ASR systems.

It should be noted that although FIG. 3A shows the audio masker separator 201 comprises both the non-stationary noise separator 2012 and the disfluency marker separator 2014, and the latter further comprises both the filled pause separator 2016 and the discourse marker separator 2018, the audio masker separator may only comprise any one or any two of the three components.

The statistics regarding the contextual information of the detected audio masker candidates, as obtained by the first context analyzer 202, may serve at least one of two purposes: the first is for the masker library builder 203 to choose proper audio masker candidates to add into the masker library; the second is for the masker inserter 9 (which will be discussed later) to select proper audio maskers from the masker library to insert into the target audio signal.

In practice, the first context analyzer 202 may be a separate component, but it may also be the audio masker separator 201 itself or a part thereof. For example, it is known that when a trained classifier identifies an object such as the non-stationary noise, the filled pause, and/or the discourse marker, it can simultaneously give a confidence value and also some other statistical data such as the position of the object and number of occurrences. In addition, as discussed above, when separating the audio masker candidates, some features such as those related to pitch, energy and spectrum have been extracted and they contain some statistical information or some statistical information may be derived therefrom.

For getting more statistics related to the detected audio maskers, further classifiers, analyzers, timers or counters may be introduced and there are many existing techniques to be adopted. All these classifiers, analyzers, timers, counters and those parts/components shared with the audio masker separator 201 are collectively referred to as, or even incorporated into, the first context analyzer 202.

Specifically, the first context analyzer 202 may be configured to obtain at least one of the following in the first audio signal: occurrence frequency of each kind of audio masker candidate for a specific duration or talkspurt, position of the audio masker candidate in a talkspurt, sound level of the audio masker candidate, long term speech level of the first audio signal, speech rate of the first audio signal, long term background stationary noise level in the first audio signal, and talker identity.

Here, as an example, a talkspurt may be identified using a VAD (Voice Activity Detector), and time information may be obtained with a timer or from the timestamp information contained in audio frames. Then the occurrence frequency of each kind of audio masker candidate for a specific duration or talkspurt may be obtained from the results of the audio masker separator, the time information or the results of the VAD. The situation for the position of the audio masker candidate in a talkspurt is the same. For evaluating the sound level of the audio masker candidate, the long term speech level of the first audio signal, the speech rate of the first audio signal and the long term background stationary noise level in the first audio signal, there are many existing techniques.

As discussed above, stationary noise is a term in contrast to non-stationary noise. For example, in the context of audio conferencing, the stationary noise may include noise generated by computer fans or an air conditioner.

Energy and spectral shape are important parameters to quantify the background noise. Again, many existing techniques may be used to detect and quantify the stationary noise. One example is Sun, X., K. Yen, et al. (2010). *Robust Noise Estimation Using Minimum Correction with Harmonicity Control. Interspeech.* Makuhari, Japan.

The talker identity can also be obtained by any machine learning based methods. But it can be understood at different levels, depending on the specific implementation. For example, for future application on the receiver side, more specific the talk identity for an audio masker is, the use of the audio masker for the same talker identity will make the resulted improved audio signal sounds more natural. In other words, the talker identity may have different "granularity": an audio masker may be recognized as originating from a specific person, or just from male or female, or just from a certain type of person. The type of person may be characterized by some audio properties such as spectrum or statistics of other attributes of the target talker, including speech rate, speech volume, and disfluency patterns including, for example, frequency of pauses. There are various kinds of pauses, including hesitation pauses, filled pauses (e.g., "um", "uh") and discourse markers (e.g. "well", "like" in English, "zhege", "neige" in Chinese) as discussed above.

Then, based on the statistics discussed above, the masker library builder 203 may select proper audio masker candidates to add into a new masker library 204 or an existing masker library 204. For example, those audio masker candidates more frequently used, or occurring more frequently at more proper position in a talkspurt may be selected as audio maskers. In another example, all the audio maskers in a masker library shall have a reasonable distribution over different sound levels of themselves, over different long-term background stationary noise levels or different speech rates in the source audio signal from which they are extracted, or over different talker identities. However, it should be noted that the discussion here is not limitative and any other rules for selecting proper audio maskers based on the statistics may be anticipated. For example, instead of the positive listing method discussed above, audio masker candidates may be screened with a negative listing method, that is, the masker library builder may be configured to discard at least one audio masker candidate based on the statistics. For example, the occurrence frequency of an audio masker may be converted into a weight factor, and we could remove maskers whose weight is below certain threshold in order to save storage space. Adaptively changing the masker library according to contextual statistics allows us to build a more compact and effective masker library.

In addition, besides facilitating selecting proper audio maskers to be added into the masker library, the statistics themselves may be incorporated into the masker library so as to be made use of during the application of the audio maskers to the target audio signal, as will be discussed later. Alternatively, the masker library builder may be configured to assign different priorities to the audio maskers in the masker library based on the statistics, and such priorities may be used in the application of the audio maskers to the target audio signal. For example, the occurrence frequency of an audio masker may be converted into a weight factor, where a low occurrence frequency results in a lower weight for an audio masker in the masker library, which will less likely be selected during masker insertion.

In a variation of the embodiment discussed above, the masker library builder 203 may do more things than simply putting proper audio masker candidates into the masker library 204. For each category of maskers, audio masker instances differ from each other in duration, amplitude, and spectral characteristics. In order to reduce the storage requirement, we could perform an optional clustering process on the audio masker instances. This can be realized through well-known clustering algorithms such as k-means or Gaussian Mixture Model (GMM). Then, as show in FIG. 3B, the masker library builder 203 may further comprise a clustering processor 2032 for clustering the audio masker candidates into different clusters. The clustering processor 2032 may be implemented with any existing clustering techniques. The clustering results may be used by the masker library builder 203 to further screen the audio masker candidates. For example, the masker library builder 203 may further comprise a masker merger 2034 for merging those audio masker candidates in the same cluster to form an audio masker by calculating an average thereof. That is, an audio masker in the masker library 204 may not be a real audio sample extracted from a real audio signal, but may be a synthesized audio segment so as to be more representative for a certain type of audio maskers in certain situation and/or for certain talker identity.

As another example, instead of using the masker merger 2034, the masker library builder 203 may be simply configured to select those audio masker candidates at and/or near the centers of the clusters as audio maskers in the masker library 204. The principle of this variation is similar to the masker merger 2034, that is, the center of a cluster or those samples near the center may be more representative of the cluster, that is, a certain type of audio masker candidates. In addition, the clustering results may be simply incorporated into the masker library 204 for facilitating the future application of the audio maskers, as will be discussed later. And in such two situations, the masker library builder 203 shown in FIG. 3B will not comprise the masker merger 2034.

As known in the field, the audio signal may be transmitted in the form of audio packets, which are normally in a standard RTP format. Then the bit stream for audio is extracted and sent to a decoder. The decoder performs the necessary dequantization and inverse transform to generate time domain PCM signals for playout. One example transform is MDCT (Modified Discrete Cosine Transform). Correspondingly, the audio masker separator can work either in the frequency domain (MDCT domain) or the time domain depending on situations. For storage in a masker library, the audio maskers can be either in the form of data in the frequency domain, i.e. in a form of MDCT coefficients for each audio frame, or in the form of audio segments in the time domain, such as a segment of time domain PCM samples.

Theoretically, in a voice communication system, the components of the audio processing apparatus, including the audio masker separator 201, the first context analyzer 202 and the masker library builder 203, may be located at either the sender side, the receiver side, or the server of an audio communication system. But if ambient noise (non-stationary noise) is removed or suppressed before the transmission, then the processing for detecting non-stationary noise is preferred to be done at the sender side.

Application of Masker Library: Defects Concealing

Figure 4:
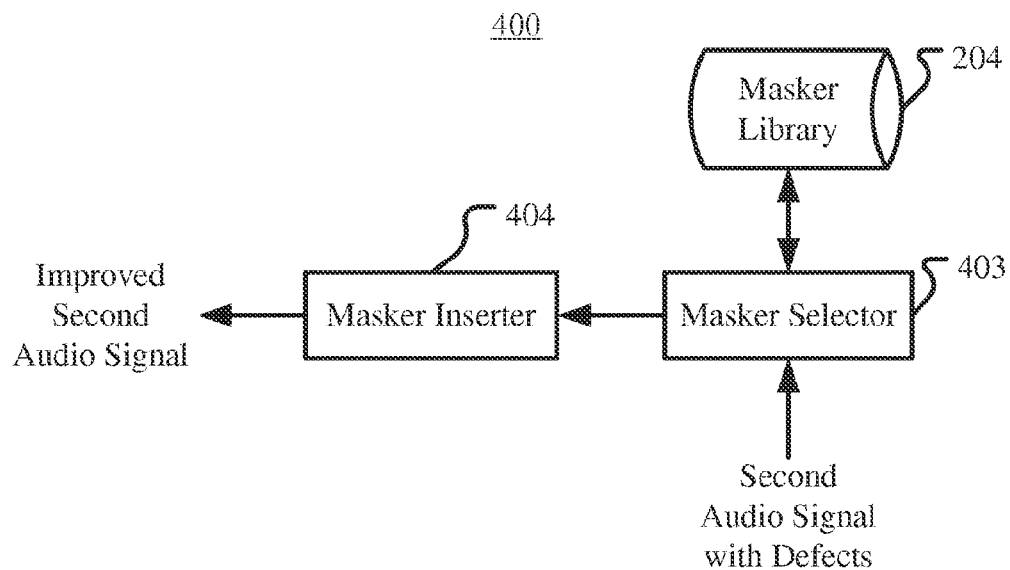
FIG. 4 to FIG. 6 are diagrams illustrating an audio processing apparatus according to another embodiment of the application and its variations.
Figure 5:
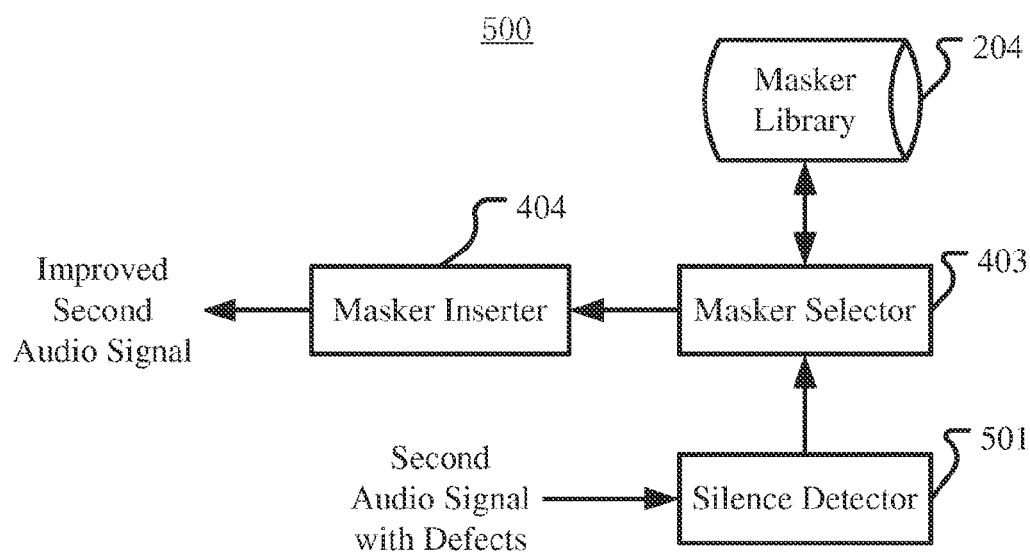
Figure 6:
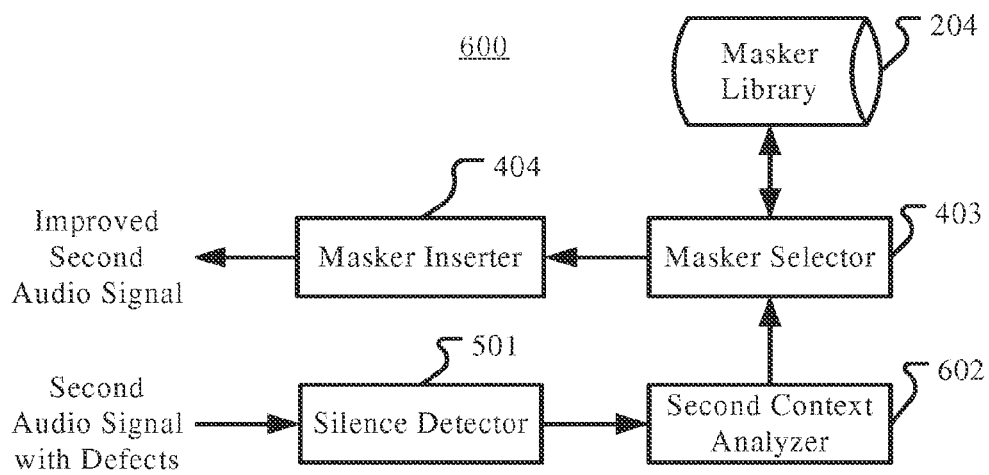

FIG. 4 to FIG. 6 are diagrams illustrating an audio processing apparatus according to a second embodiment of the application and its variations, on the listener side or receiver side.

As shown in FIG. 4, the audio processing apparatus 400 of the second embodiment comprises a masker library 204 comprising audio maskers to be inserted into a target audio signal to conceal defects in the target audio signal; a masker selector 403 for selecting an audio masker from the masker library; and a masker inserter 404 for inserting the selected audio masker into a target position in the target audio signal.

The masker library 204 may be built by the audio processing apparatus discussed in the first embodiment of the present application, and the audio masker may comprise at least one of the following: an audio segment comprising non-stationary noise, an audio segment comprising a filled pause, and an audio segment comprising a discourse marker. The details thereof are omitted here.

The masker selector 403 may follow some rules, as will be discussed later, to select proper audio maskers from the masker library 204 located at the receiver side to insert into the target audio signal, that is, a second audio signal with some defects, to get an improved second audio signal which sounds more natural. However, the masker selector 403 may also just execute an instruction from the sender side or the server to withdraw an audio masker specified by the instruction from the masker library. For example, in the case of talker's silence as will be discussed below, a proper masker may be decided at the sender side or at the server (but maybe in the same manner as in the second embodiment discussed herein, for example by a similar masker selector 403) and sent to the receiver side. In such a situation, the sender side or the server must know the contents of the masker library 204 at the receiver side and generally a duplicate of the masker library 204 would be provided at the sender side. In fact, the masker library 204 is generally built at the sender side because the sender side has complete information of the talker and its environment. Although the sender side or the server may send a real audio masker to the receiver side (then the masker selector 403 may be omitted), it is preferred that the receiver side has a "duplicate" of the masker library at the sender side, and the audio maskers in the masker library 204 are indexed and only a corresponding index is transmitted by the masker selector 403 at the sender side to the masker selector 403 at the receiver side, to indicate to the masker inserter 404 which audio masker is to be inserted.

The masker inserter 404 is configured to insert the selected audio masker into the target position in the target audio signal. In other words, the selected audio masker is used to replace a target segment or be placed in the position of lost packets. The information regarding the target position may be obtained in the manner as discussed below, or, similar to the masker selector and the information regarding the selected audio masker, the target position may be provided by the sender side or the server, which implements a target position identification process similar to that as will be discussed below.

As a variant 500 of the second embodiment, the audio processing apparatus may further comprise a silence detector 501 for detecting a silence segment in the target audio signal, wherein the masker inserter 404 is configured to replace the silence segment with the selected audio masker. The silence segment in the target audio signal may be obtained through various means. For example, VAD may be used to detect the start and end of a talkspurt, then naturally, a silence period may be obtained between two consecutive talkspurts. Here, if the audio masker is to be selected at the sender side or the server as stated above, then the silence detector 501 shall also be provided at the sender side or the server. As another example, in some of the present voice communication systems, embedded in the first and last frame in a talkspurt are flags for indicating the start and end of a talkspurt, and/or time-stamps, and/or flags for indicating the start and end of a silence period. From these information the silence segment may be identified.

In another variant not shown in the drawings, the target position may correspond to artifacts occurred in the target audio signal, and the masker inserter is configured to replace a segment comprising the artifacts with the selected audio masker. In the variation, the information regarding the target position may come from some other components of the voice communication system. For example, in the process of jitter buffer control some packets may be repeated, and thus some artifacts will occur. In another example, clipping may occur in some frames when the speaker amplifier is over-driven. Then according to the present variant, the jitter buffer controller may communicate the position of the packet repeating to the masker selector 403 and masker inserter 404, and a proper audio masker may be selected and inserted into the position.

In yet another variation of the second embodiment not shown in the drawings, the target position may correspond to one or more packet losses occurred in the target audio signal, and the masker inserter is configured to insert the selected audio masker into the position of one more lost packets. Similar to above, the jitter buffer controller may discard some packets received too late, that is, some audio frames may be lost. Then the jitter buffer controller may tell the masker selector 403 and the masker inserter 404 the position of the lost packet(s).

In another variant 600 as shown in FIG. 6, the audio processing apparatus may further comprise a second context analyzer 602 for obtaining statistics regarding contextual information of the target position, wherein the masker library 204 further comprises statistics regarding contextual information of the audio maskers; and the masker selector 403 is configured to select the audio masker based on the statistics regarding contextual information of the audio maskers in the masker library 204 and the statistics obtained by the second context analyzer 602. This is for making the improved second audio signal sound more natural by inserting a proper audio masker into a proper position which has a context similar to the context from which the audio masker is extracted. That is, simply speaking, the masker selector 403 may compare or match the context information of the audio maskers with the context information of the target position, and select the audio masker matching the best.

As discussed in the first embodiment, the statistics regarding contextual information of the audio maskers may comprise at least one of the following in a source audio signal from which the maskers are extracted: occurrence frequency of each kind of audio masker for a specific duration or talkspurt, position of the audio masker in a talkspurt, sound level of the audio masker, long term speech level of the source audio signal, speech rate of the source audio signal, long term background stationary noise level in the source audio signal, and talker identity. Then correspondingly, the second context analyzer 602 may obtain similar statistics, such as at least one of the following in the audio signal: occurrence frequency of target position for a specific duration or per talkspurt, position of the target position in a talkspurt, long term speech level, speech rate, long term background stationary noise level, and talker identity. The second context analyzer 602 may adopt techniques similar to those adopted in the first context analyzer 202 discussed in the first embodiment.

For the situations where the target position comprises information regarding positions of artifacts or lost packet(s), the second context analyzer 602 may be located at the receiver side; and for the situation where the target position is the position of the silence segment and the silence detector 501 is located at the sender side or the server, the second context analyzer 602 may be located at the sender side or the server, but it may also be located at the receiver side.

Similar to the first embodiment, the audio processing apparatus according to the second embodiment may work in either frequency domain or time domain. This sometimes depends on the PLC (Packet Loss Concealment) algorithm that is used in the system. For example, if the system only supports a time domain PLC, i.e. the algorithm works entirely in the time domain, it would be beneficial to store the maskers in the time domain (both at the receiver side and the sender side) to avoid the extra decoding process, which sometimes can be time consuming.

Combination of Embodiments and Application Scenarios

Both the first and second embodiments and variants thereof discussed above may be implemented in any combination thereof, and any components mentioned in different parts/embodiments but having the same or similar functions may be implemented as the same or separate components.

Specifically, the combination of the two embodiments may be, but not limited to, in two forms or two scenarios.

One is the first embodiment and the second embodiment may be incorporated in the same audio processing apparatus, so that the audio processing apparatus can simultaneously build and/or update a first masker library to be used by the other audio processing apparatus at the other end of a conversation, and use a second masker library built and/or updated by the other audio processing apparatus to conceal the defects in the audio signal transmitted from the other audio processing apparatus. In this scenario, the audio processing apparatus is just a simple combination of the first embodiment and the second embodiment, except that those components having similar functions may be shared or partly shared.

Figure 7:
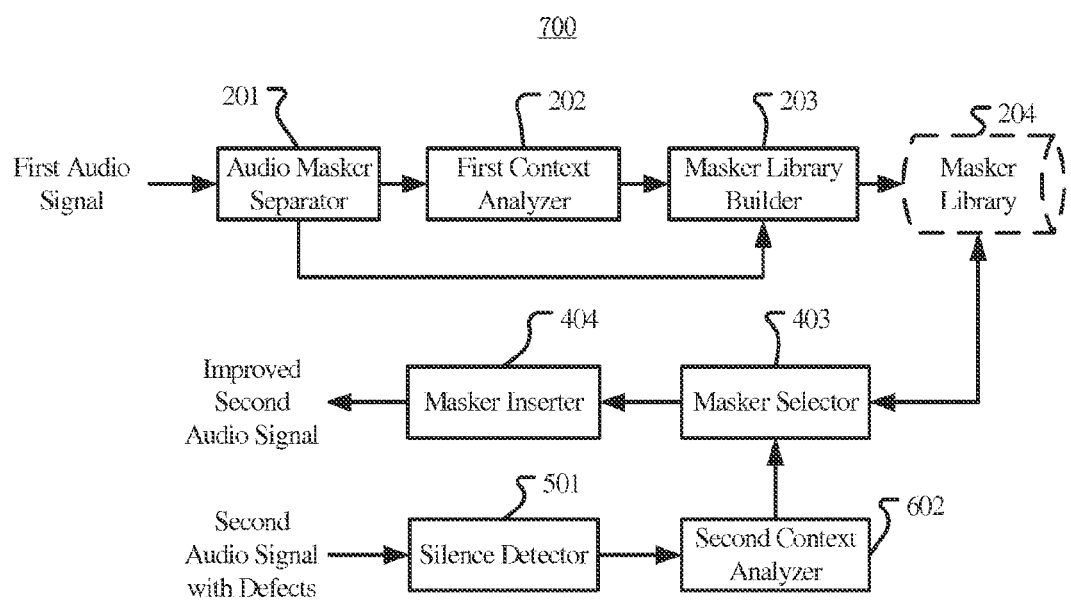
FIG. 7 is a diagram illustrating an audio processing apparatus according to yet another embodiment of the application.

The other scenario is the audio processing apparatus is distributed at the sender side, the receiver side, and/or the server and realizes both the functions for building a masker library and the functions for making use of the same masker library. That is, the apparatus together with other components constitute a voice processing system. FIG. 7 shows such a scenario.

As shown in FIG. 7, on one hand, the audio processing apparatus 700 comprises an audio masker separator 201, a first context analyzer 202 and a masker library builder 203 as discussed in the first embodiment; on the other hand, the audio processing apparatus 700 further comprises a masker library 204, a silence detector 501, a second context analyzer 602, a masker selector 403 and a masker inserter 404 as discussed in the second embodiment.

Please note that just as described in connection with the second embodiment, in some variations the silence detector 501 and/or the second context analyzer 602 may be omitted, and/or the target position may corresponds to artifacts occurred in the second audio signal or one or more packet losses occurred in the second audio signal.

The other aspects discussed in the first and second embodiments are also applicable to the combination discussed herein, and are omitted herein.

Figure 8:
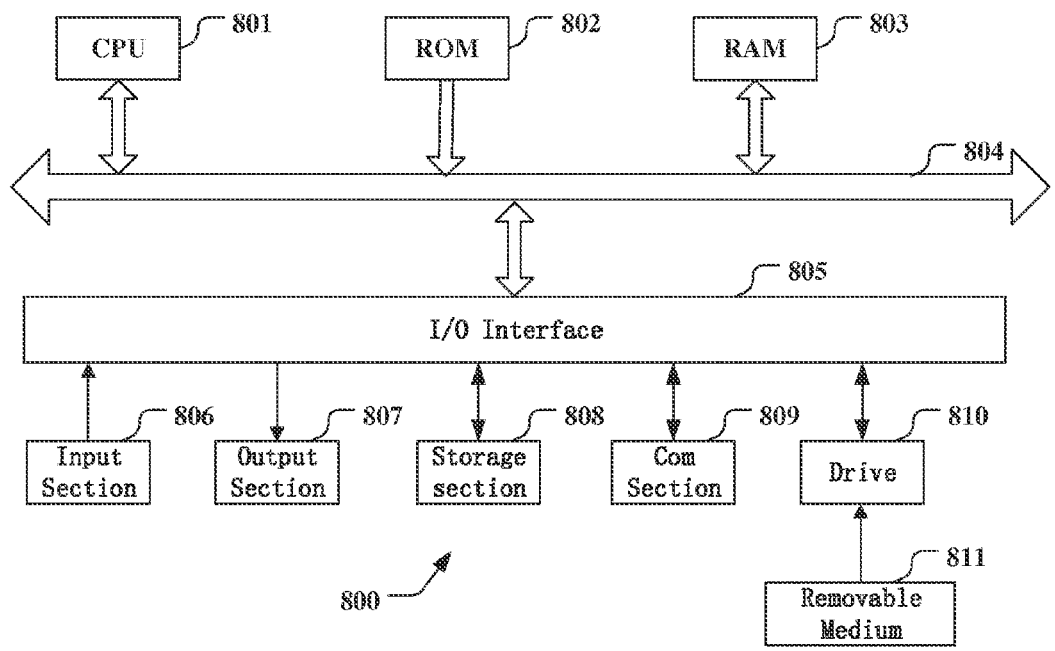
FIG. 8 is a block diagram illustrating an exemplary system for implementing embodiments of the present application.

As discussed at the beginning of the Detailed Description of the present application, the embodiment of the application may be embodied either in hardware or in software, or in both. FIG. 8 is a block diagram illustrating an exemplary system for implementing the aspects of the present application.

In FIG. 8, a central processing unit (CPU) 801 performs various processes in accordance with a program stored in a read only memory (ROM) 802 or a program loaded from a storage section 808 to a random access memory (RAM) 803. In the RAM 803, data required when the CPU 801 performs the various processes or the like are also stored as required.

The CPU 801, the ROM 802 and the RAM 803 are connected to one another via a bus 804. An input/output interface 805 is also connected to the bus 804.

The following components are connected to the input/output interface 805: an input section 806 including a keyboard, a mouse, or the like; an output section 807 including a display such as a cathode ray tube (CRT), a liquid crystal display (LCD), or the like, and a loudspeaker or the like; the storage section 808 including a hard disk or the like; and a communication section 809 including a network interface card such as a LAN card, a modem, or the like. The communication section 809 performs a communication process via the network such as the internet.

A drive 810 is also connected to the input/output interface 805 as required. A removable medium 811, such as a magnetic disk, an optical disk, a magneto-optical disk, a semiconductor memory, or the like, is mounted on the drive 810 as required, so that a computer program read therefrom is installed into the storage section 808 as required.

In the case where the above-described components are implemented by the software, the program that constitutes the software is installed from the network such as the internet or the storage medium such as the removable medium 811.

Audio Processing Methods

In the process of describing the audio processing apparatus in the embodiments hereinbefore, apparently disclosed are also some processes or methods. Hereinafter a summary of these methods is given without repeating some of the details already discussed hereinbefore, but it shall be noted that although the methods are disclosed in the process of describing the audio processing apparatus, the methods do not necessarily adopt those components as described or are not necessarily executed by those components. For example, the embodiments of the audio processing apparatus may be realized partially or completely with hardware and/or firmware, while it is possible that the audio processing methods discussed below may also be realized totally by a computer-executable program, although the methods may also adopt the hardware and/or firmware of the audio processing apparatus.

According to a third embodiment of the present application, an audio processing method 900 may comprise separating from a first audio signal an audio material comprising a sound other than stationary noise and utterance meaningful in semantics, as an audio masker candidate (operation 902); obtaining statistics regarding contextual information of detected audio masker candidates (operation 904); and building a masker library or updating an existing masker library by adding, based on the statistics, at least one audio masker candidate as an audio masker into the masker library (operation 906), wherein audio maskers in the maker library are used to be inserted into a target position in a second audio signal to conceal defects in the second audio signal.

The audio masker may comprise at least one of an audio material comprising non-stationary noise, an audio material comprising a filled pause and an audio material comprising a discourse marker, and they may be detected or separated from the first audio signal (source audio signal) with any machine learning based methods.

The statistics may comprise at least one of the following in the first audio signal: occurrence frequency of each kind of audio masker candidate for a specific duration or talkspurt, position of the audio masker candidate in a talkspurt, sound level of the audio masker candidate, long term speech level of the first audio signal, speech rate of the first audio signal, long term background stationary noise level in the first audio signal, and talker identity. Based on the statistics, different priorities may be assigned to the audio maskers in the masker library, or some audio masker candidates may be discarded.

Figure 10:
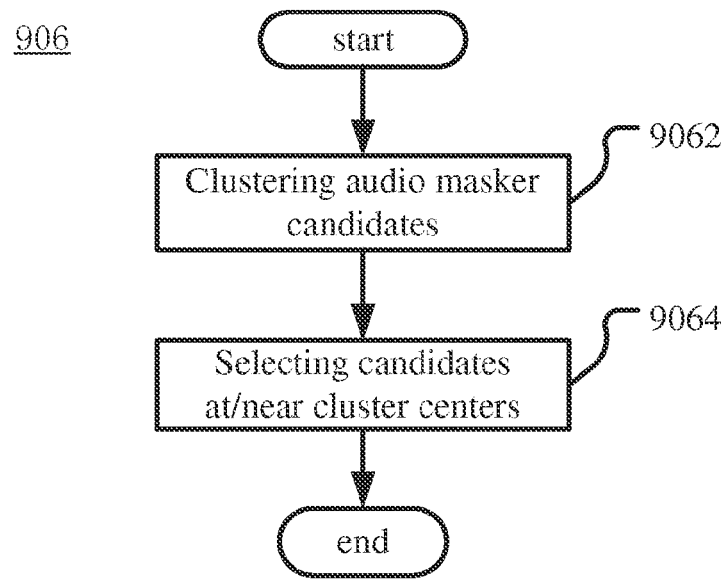
Figure 11:
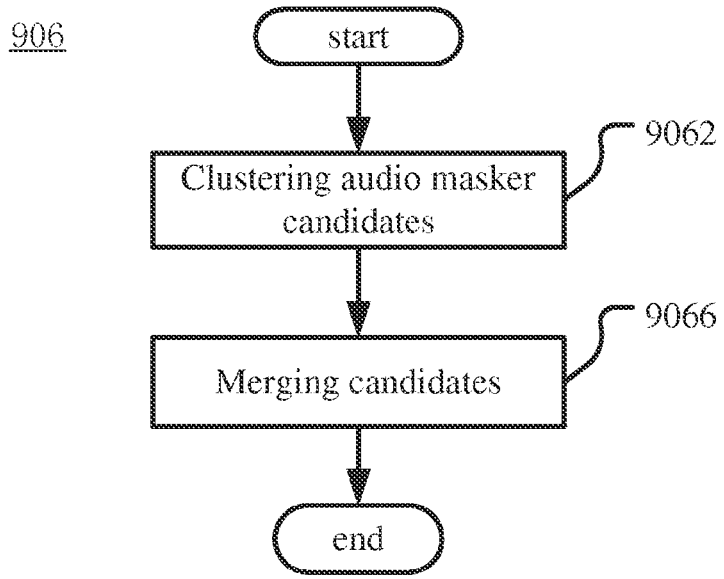

In a variation of the third embodiment, when building the masker library or updating the existing masker library, the audio masker candidates may be clustered into different clusters (operation 9062, FIG. 10), and those audio masker candidates at and/or near the centers of the clusters may be selected as audio maskers to be added into the masker library (operation 9064, FIG. 10). Alternatively, those audio masker candidates in the same cluster may be merged by calculating an average thereof, to form a synthesized audio masker to be added into the masker library (operation 9066, FIG. 11).

Depending on situations, the operation of separating audio maskers may work in the frequency domain, with the audio maskers in the form of data in the frequency domain; or work in the time domain, with the audio maskers in the form of audio segments in the time domain.

According to a fourth embodiment of the present application, an audio processing method 1200 may comprise selecting an audio masker from a masker library 204 comprising audio maskers to be inserted into a target audio signal (second audio signal with defects) to conceal defects in the target audio signal; and inserting the selected audio masker into a target position in the target audio signal (operation 1208) to obtain improved second audio signal which sounds more natural due to the concealment of the defects. The audio masker may comprise at least one of the following: an audio segment comprising non-stationary noise, an audio segment comprising a filled pause and an audio segment comprising a discourse marker.

According to a variation 1300 of the fourth embodiment, the method may further comprise detecting a silence segment in the target audio signal (operation 1302), wherein the operation of inserting 1208 comprises replacing the silence segment with the selected audio masker.

Alternatively, the target position may correspond to artifacts occurred in the target audio signal, and the operation of inserting 1208 comprises replacing a segment comprising the artifacts with the selected audio masker. Or, the target position may correspond to one or more packet losses occurred in the target audio signal, and the operation of inserting 1208 comprises inserting the selected audio masker into the position of one more lost packets.

According to another variation 1400 of the fourth embodiment, the method may further comprise obtaining statistics regarding contextual information of the target position (operation 1404), wherein, the masker library 204 further comprises statistics regarding contextual information of the audio maskers; and the operation of selecting the audio masker from the masker library (operation 1206) may comprise selecting the audio masker based on the statistics regarding contextual information of the audio maskers in the masker library 204 and the statistics regarding contextual information of the target position.

In the fourth embodiment and its variations, the statistics regarding contextual information of the target position may comprise at least one of the following in the audio signal: occurrence frequency of target position for a specific duration or per talkspurt, position of the target position in a talkspurt, long term speech level, speech rate, long term background stationary noise level, and talker identity; and the statistics regarding contextual information of the audio maskers may comprise at least one of the following in a source audio signal from which the maskers are extracted: occurrence frequency of each kind of audio masker for a specific duration or talkspurt, position of the audio masker in a talkspurt, sound level of the audio masker, long term speech level of the source audio signal, speech rate of the source audio signal, long term background stationary noise level in the source audio signal, and talker identity.

Depending on situations, the operation of selecting the audio masker and the operation of inserting the selected audio masker may be performed at different sites among a sender side, a receiver side, and a server of an audio communication system, rather than at the same site. Correspondingly, duplicates of the masker library may be provided at the different sites to be used by the operation of selecting and the operation of inserting, respectively. Then, the audio maskers in the masker library may be indexed and only a corresponding index is transmitted to indicate which audio masker is to be inserted, and for completing the operation of inserting, a proper audio masker may be extracted from the masker library (a duplicate thereof) according to the transmitted index.

Figure 9:
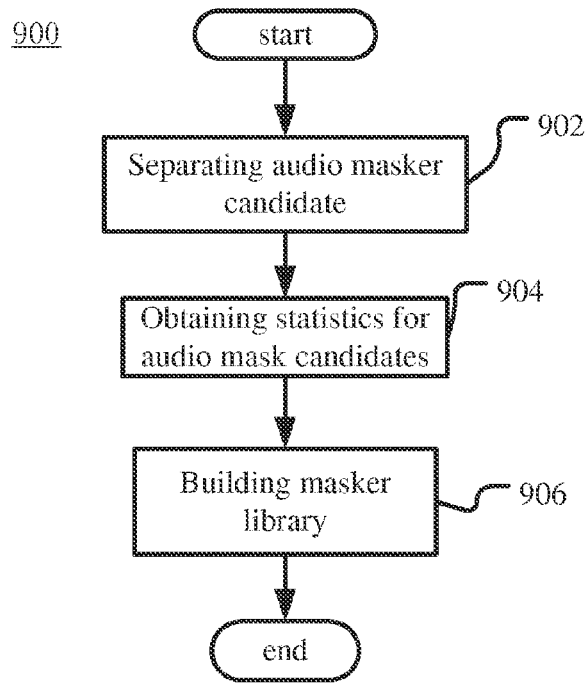
FIGS. 9-17 are flow charts illustrating audio processing methods according to embodiments of the present application and some variations thereof.
Figure 12:
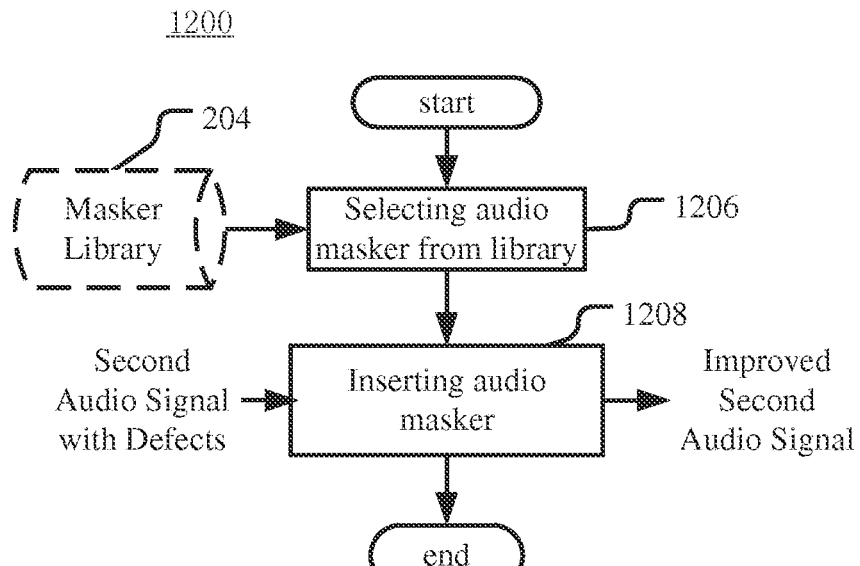
Figure 13:
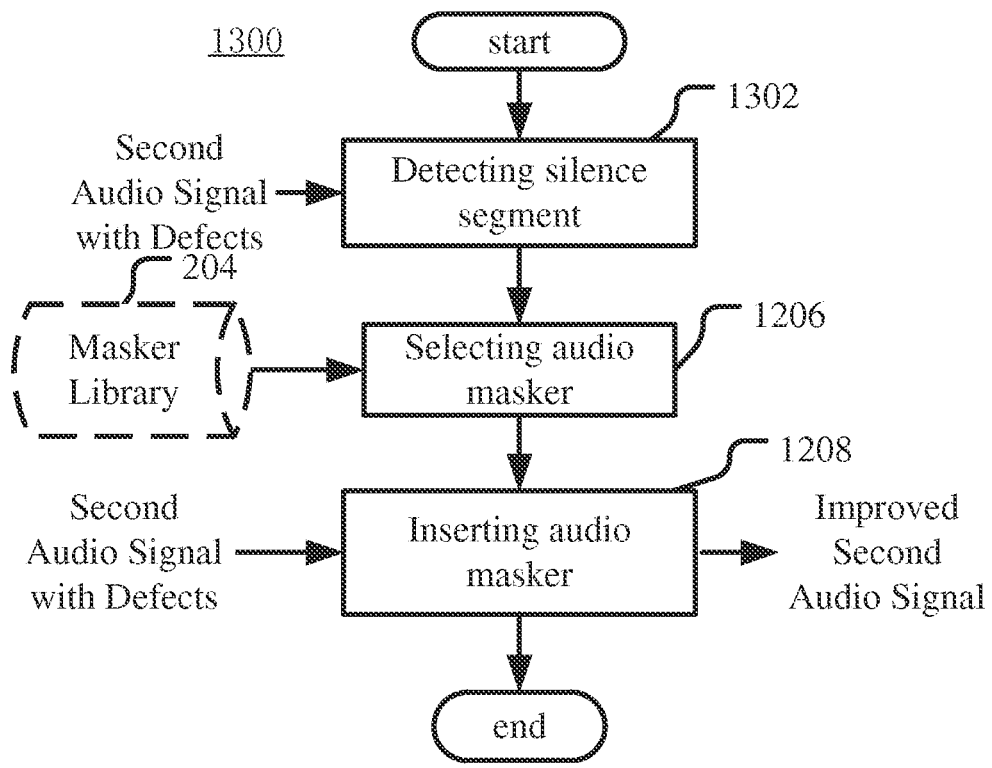
Figure 14:
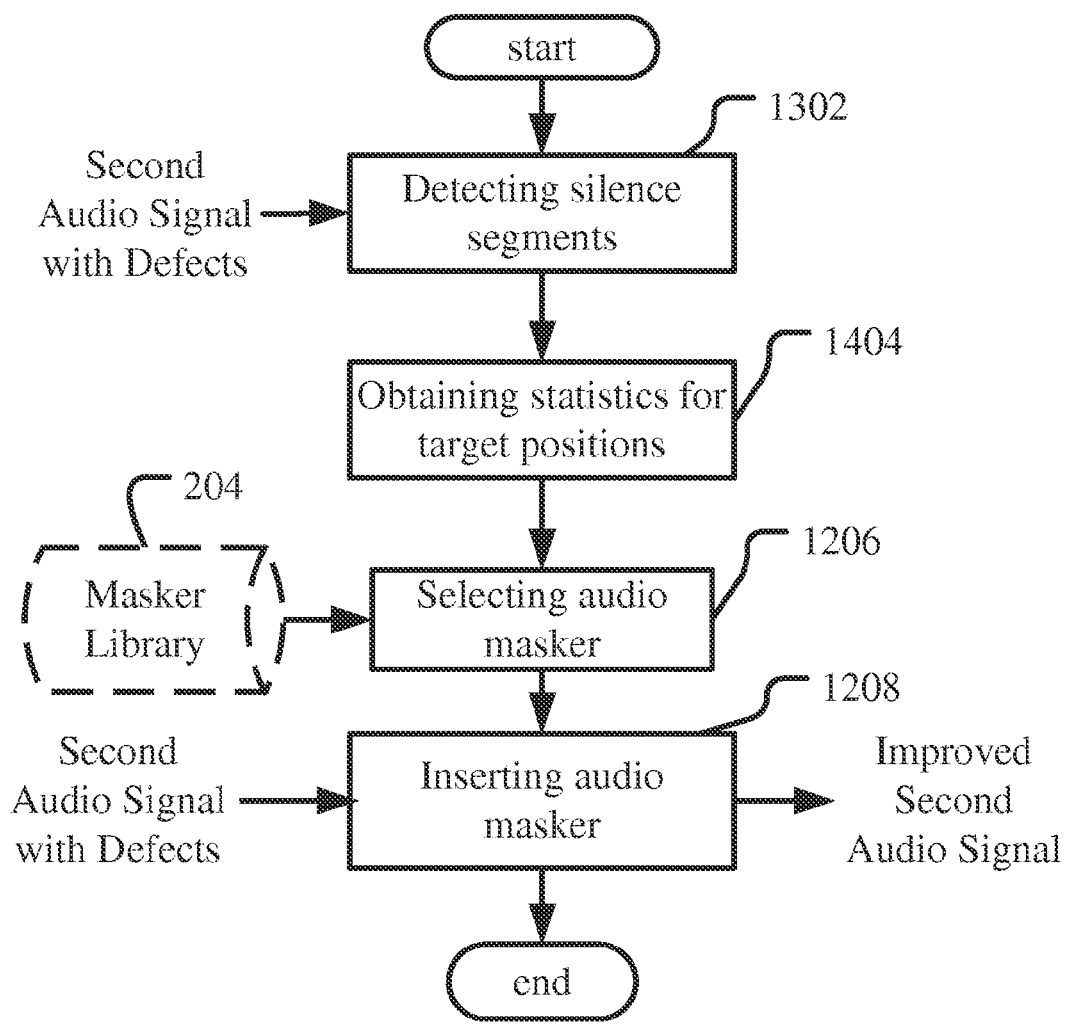
Figure 15:
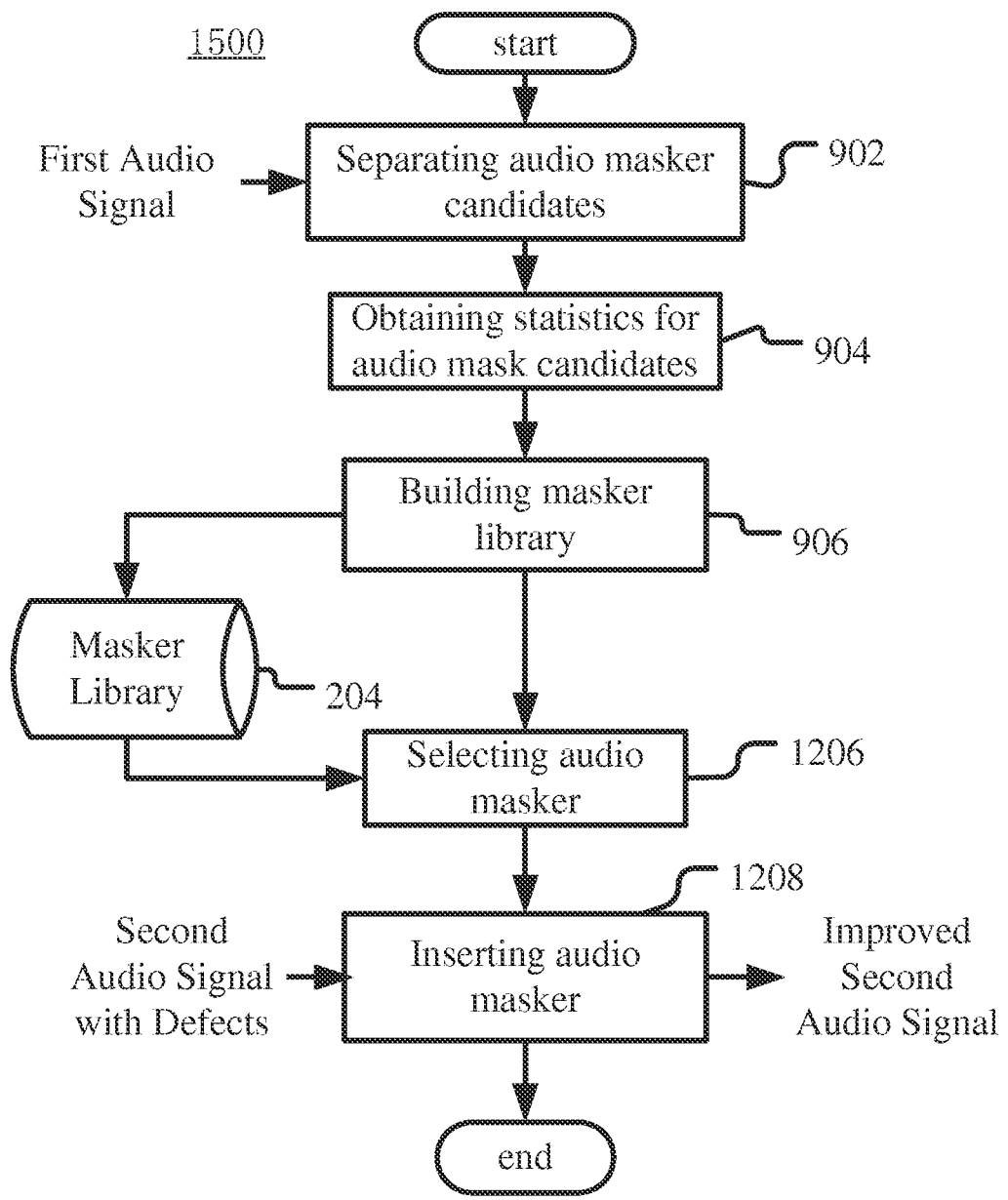
Figure 16:
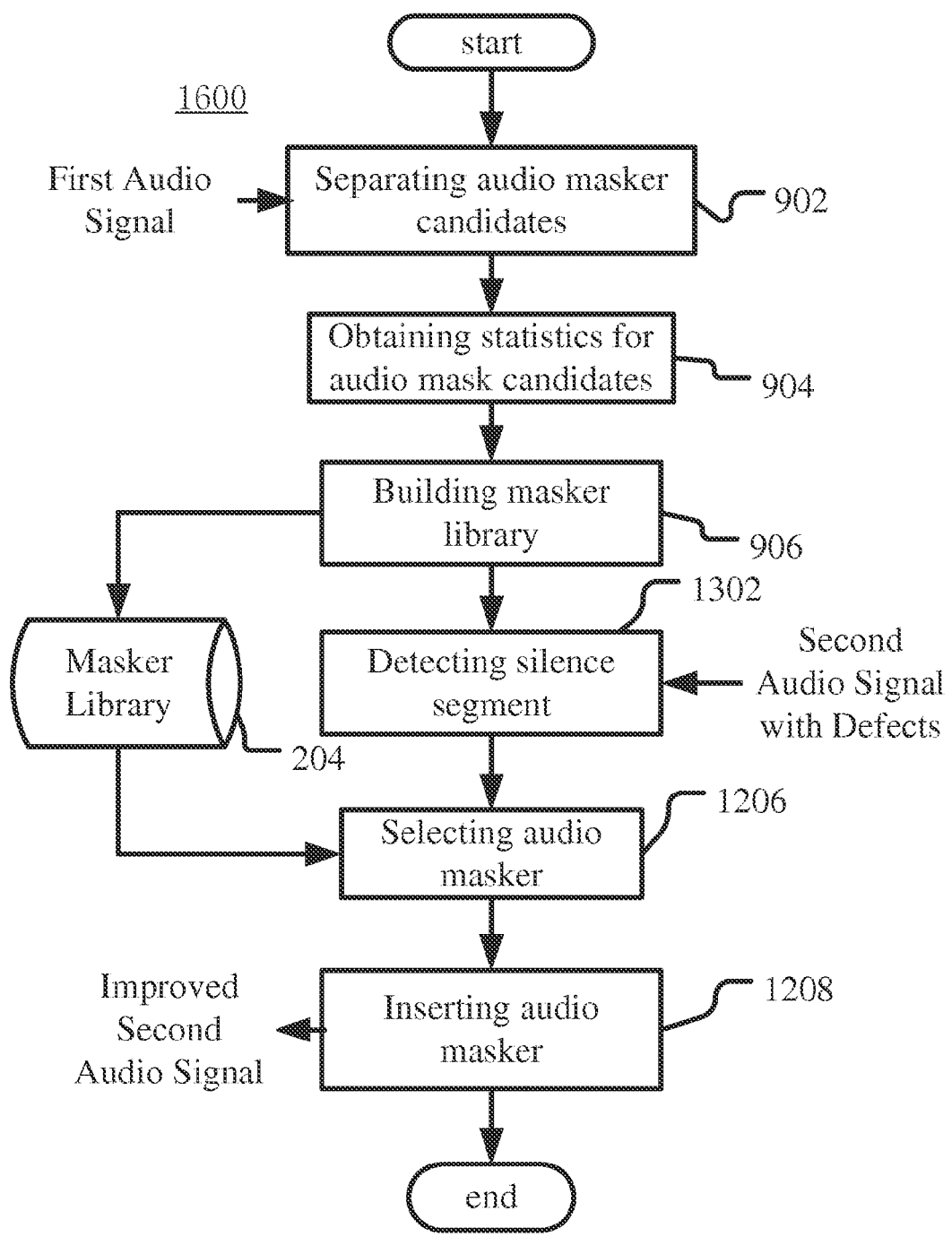
Figure 17:
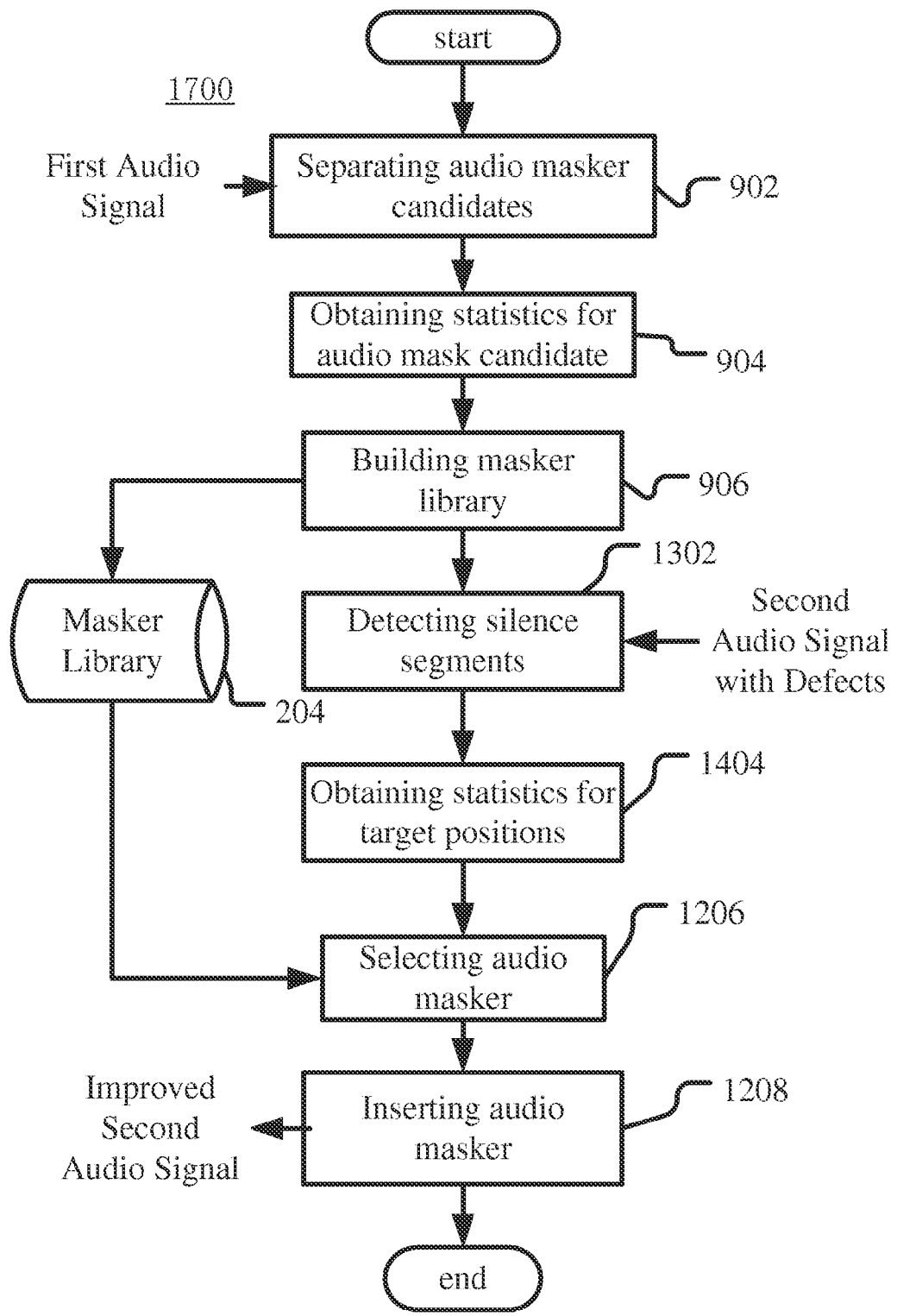

Similar to the embodiments of the audio processing apparatus, any combination of the third and fourth embodiment and their variations are possible. FIGS. 15-17 show three combinations 1500, 1600, 1700 respectively, in which the third embodiment as described with reference to FIG. 9 (as well as FIGS. 10 and 11) is combined with the fourth embodiment and its variations as described with reference to FIGS. 12, 13 and 14, respectively.

Please note the terminology used herein is for the purpose of describing particular embodiments only and is not intended to be limiting of the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present application has been presented for purposes of illustration and description, but is not intended to be exhaustive or limited to the application in the form disclosed. Many modifications and variations will be apparent to those of ordinary skill in the art without departing from the scope and spirit of the application. The embodiment was chosen and described in order to best explain the principles of the application and the practical application, and to enable others of ordinary skill in the art to understand the application for various embodiments with various modifications as are suited to the particular use contemplated.

We claim:

1. An audio processing apparatus comprising:
   an audio masker separator for separating, from a first audio signal, an audio material as an audio masker candidate, the audio material comprising a sound other than stationary noise and utterance meaningful in semantics;
   a first context analyzer for obtaining statistics regarding contextual information of detected audio masker candidates;
   wherein the statistics regarding contextual information of detected audio masker candidates comprise statistics regarding at least one of the following in the first audio signal: occurrence frequency of each kind of audio masker candidate for a specific duration or talkspurt, position of the audio masker candidate in a talkspurt, sound level of the audio masker candidate, long term speech level of the first audio signal, speech rate of the first audio signal, long term background stationary noise level in the first audio signal, and talker identity; and
   a masker library builder for building a masker library or updating an existing masker library by adding, based on the statistics, at least one audio masker candidate as an audio masker into the masker library, wherein audio maskers in the maker library are used to be inserted into a target position in a second audio signal to conceal defects in the second audio signal;
   wherein the masker library builder is configured to assign different priorities to the audio maskers in the masker library based on the statistics.

2. The audio processing apparatus according to claim 1, wherein the audio masker candidate represents one of: non-stationary noise, a disfluency marker, or a discourse marker.

3. The audio processing apparatus according to claim 1, wherein the masker library builder further comprises a clustering processor for clustering the audio masker candidates into different clusters.

4. The audio processing apparatus according to claim 3, wherein the masker library builder is configured to select those audio masker candidates at and/or near centers of the clusters as audio maskers in the masker library.

5. The audio processing apparatus according to claim 3, wherein the masker library builder further comprises a masker merger for merging those audio masker candidates in the same cluster to form an audio masker by calculating an average thereof.

6. The audio processing apparatus according to claim 1, wherein the masker library builder is configured to discard at least one audio masker candidate based on the statistics.

7. The audio processing apparatus according to claim 1, further comprising:
   a masker selector for selecting an audio masker from the masker library; and
   a masker inserter for inserting the selected audio masker into the target position in the second audio signal.

8. The audio processing apparatus according to claim 7, further comprising a silence detector for detecting a silence segment in the second audio signal, wherein the masker inserter is configured to replace the silence segment with the selected audio masker.

9. The audio processing apparatus according to claim 7, wherein the target position corresponds to artifacts occurred in the second audio signal, and wherein the masker inserter is configured to replace a segment comprising the artifacts with the selected audio masker.

10. The audio processing apparatus according to claim 7, wherein the target position corresponds to one or more packet losses occurred in the second audio signal, and wherein the masker inserter is configured to insert the selected audio masker into the position of one or more lost packets.

11. An audio processing apparatus, comprising:
   a masker library comprising audio maskers to be inserted into a target audio signal to conceal defects in the target audio signal;
   a masker selector for selecting an audio masker from the masker library; and
   a masker inserter for inserting the selected audio masker into a target position in the target audio signal, wherein the audio masker comprises at least one of the following: an audio segment comprising non-stationary noise, an audio segment comprising a filled pause and an audio segment comprising a discourse marker;
   wherein the masker selector and the masker inserter are located at different sites;
   wherein the audio maskers in the masker library are indexed and only a corresponding index is transmitted to indicate to the masker inserter which audio masker is to be inserted.

12. An audio processing apparatus, comprising:
a masker library comprising audio maskers to be inserted into a target audio signal to conceal defects in the target audio signal;
a masker selector for selecting an audio masker from the masker library; and
a masker inserter for inserting the selected audio masker into a target position in the target audio signal, further comprising a context analyzer for obtaining statistics regarding contextual information of the target position,
wherein the masker library further comprises statistics regarding contextual information of the audio maskers;
wherein the masker selector is configured to select the audio masker based on the statistics regarding contextual information of the audio maskers in the masker library and the statistics obtained by the context analyzer;
wherein the masker selector and the masker inserter are located at different sites;
wherein the audio maskers in the masker library are indexed and only a corresponding index is transmitted to indicate to the masker inserter which audio masker is to be inserted.

13. The audio processing apparatus according to claim 12, wherein, the context analyzer is configured to obtain at least one of the following in the audio signal: occurrence frequency of target position for a specific duration or per talkspurt, position of the target position in a talkspurt, long term speech level, speech rate, long term background stationary noise level, and talker identity; and the statistics regarding contextual information of the audio maskers comprise at least one of the following in a source audio signal from which the audio maskers are extracted: occurrence frequency of each kind of audio masker for a specific duration or talkspurt, position of the audio masker in a talkspurt, sound level of the audio masker, long term speech level of the source audio signal, speech rate of the source audio signal, long term background stationary noise level in the source audio signal, and talker identity.

14. The audio processing apparatus according to claim 12, wherein at least one of the components of the audio processing apparatus is located at a sender side, a receiver side, or a server of an audio communication system.

15. The audio processing apparatus according to claim 14, wherein duplicates of the masker library are provided at the sender side and/or the receiver side and/or the server.

16. A computer-implemented method comprising:
separating, from a first audio signal, an audio material as an audio masker candidate, the audio material comprising a sound other than stationary noise and utterance meaningful in semantics;
obtaining statistics regarding contextual information of detected audio masker candidates;
wherein the statistics regarding contextual information of detected audio masker candidates comprise statistics regarding at least one of the following in the first audio signal: occurrence frequency of each kind of audio masker candidate for a specific duration or talkspurt, position of the audio masker candidate in a talkspurt, sound level of the audio masker candidate, long term speech level of the first audio signal, speech rate of the first audio signal, long term background stationary noise level in the first audio signal, and talker identity; and
building a masker library or updating an existing masker library by adding, based on the statistics, at least one audio masker candidate as an audio masker into the masker library, wherein audio maskers in the maker library are used to be inserted into a target position in a second audio signal to conceal defects in the second audio signal;
wherein different priorities are assigned to the audio maskers in the masker library based on the statistics.

17. The method according to claim 16, wherein the audio masker candidate represents one of: non-stationary noise, a disfluency marker, or a discourse marker.

18. The method according to claim 16, further comprising obtaining at least one of the following in the first audio signal: occurrence frequency of each kind of audio masker candidate for a specific duration or talkspurt, position of the audio masker candidate in a talkspurt, sound level of the audio masker candidate, long term speech level of the first audio signal, speech rate of the first audio signal, long term background stationary noise level in the first audio signal, and talker identity.

19. The method according to claim 16, further comprising clustering the audio masker candidates into different clusters.

20. The method according to claim 16, further comprising discarding at least one audio masker candidate based on the statistics.

21. The method according to claim 16, further comprising:
selecting an audio masker from the masker library; and
inserting the selected audio masker into the target position in the second audio signal.

22. A computer-implemented method, comprising:
causing a masker selector to select an audio masker from a masker library;
wherein the masker library comprises audio maskers to be inserted into a target audio signal to conceal defects in the target audio signal;
causing a masker inserter to insert the selected audio masker into a target position in the target audio signal, wherein the audio masker comprises at least one of the following: an audio segment comprising non-stationary noise, an audio segment comprising a filled pause and an audio segment comprising a discourse marker;
wherein the masker selector and the masker inserter are located at different sites;
wherein the audio maskers in the masker library are indexed and only a corresponding index is transmitted to indicate to the masker inserter which audio masker is to be inserted.

23. A computer-implemented method comprising:
causing a masker selector to select an audio masker from a masker library;
wherein the masker library comprises audio maskers to be inserted into a target audio signal to conceal defects in the target audio signal;
causing a masker inserter to insert the selected audio masker into a target position in the target audio signal;
causing a context analyzer to obtain statistics regarding contextual information of the target position;
wherein the masker library further comprises statistics regarding contextual information of the audio maskers;
wherein the masker selector is configured to select the audio masker based on the statistics regarding contextual information of the audio maskers in the masker library and the statistics obtained by the context analyzer;
wherein the masker selector and the masker inserter are located at different sites;

wherein the audio maskers in the masker library are indexed and only a corresponding index is transmitted to indicate to the masker inserter which audio masker is to be inserted.

* * * * *